United States Patent
Kluender et al.

(10) Patent No.: US 6,732,073 B1
(45) Date of Patent: May 4, 2004

(54) SPECTRAL ENHANCEMENT OF ACOUSTIC SIGNALS TO PROVIDE IMPROVED RECOGNITION OF SPEECH

(75) Inventors: Keith R. Kluender, Madison, WI (US); Rick L. Jenison, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 631 days.

(21) Appl. No.: 09/726,545

(22) Filed: Sep. 7, 2000

Related U.S. Application Data

(60) Provisional application No. 60/153,411, filed on Sep. 10, 1999.

(51) Int. Cl.$^7$ ............................................. G10L 15/20
(52) U.S. Cl. .................................... 704/233; 704/200.1
(58) Field of Search ............................ 704/231–236, 704/224–228, 200, 200.1

(56) References Cited

U.S. PATENT DOCUMENTS

| | | |
|---|---|---|
| 3,180,936 A | 4/1965 | Schroeder |
| 4,051,331 A | 9/1977 | Strong et al. |

(List continued on next page.)

FOREIGN PATENT DOCUMENTS

| | | |
|---|---|---|
| EP | 0556992 | 8/1993 |

OTHER PUBLICATIONS

N. W. White, "Compression Systems for Hearing Aids and Cochlear Prostheses," Journal of Rehabilitation Research and Developement, vol. 23, No. 1, 1986, pp. 25–39. (Veterans Administration).

Quentin Summerfield, "Auditory enhancement of changes in spectral amplitude," J. Acoust. Soc. Am., vol. 81, No. 3, Mar. 1987, pp. 700–708. (Acoustical Society of America).

P. P. Vaidyanathan, "Quadrature Mirror Filter Banks, M–Band Extensions and Perfect–Reconstruction Techniques," IEEE ASSP Magazine, Jul. 1987, pp. 4–20. (IEEE Acoustics, Speech, and Signal Processing Society).

Michael Nilsson, et al., "Development of the Hearing In Noise Test for the measurement of speech reception thresholds in quiet and in noise," J. Acoust. Soc. Am., vol. 95, No. 2, Feb. 1994, pp. 1085–1099. (Acoustical Society of America).

Andrew J. Lotto, Keith R. Kluender, "General contrast effects in speech preception: Effect of preceding liquid on stop consonant identification," Preception & Psychophysics, vol. 60, No. 4, 1998, pp. 602–619. (Psychonomic Society).

(List continued on next page.)

*Primary Examiner*—David D. Knepper
(74) *Attorney, Agent, or Firm*—Foley & Lardner

(57) ABSTRACT

A method and apparatus for enhancing an auditory signal to make sounds, particularly speech sounds, more distinguishable. An input auditory signal is divided into a plurality of spectral channels. An output gain for each channel is derived based on the time varying history of the energy in the channel and, preferably, the time varying history of energy in neighboring channels. The magnitude of the output gain for each channel thus derived is preferably inversely related to the history of energy in the channel. The output gain derived for each channel is applied to the channel to form a plurality of modified spectral channel signals. The plurality of modified spectral channel signals are combined to form an enhanced output auditory signal. The present invention is particularly applicable to electronic hearing aid devices, speech recognition systems, and the like.

18 Claims, 2 Drawing Sheets

U.S. PATENT DOCUMENTS

| | | |
|---|---|---|
| 4,185,168 A | 1/1980 | Graupe et al. |
| 4,249,042 A | 2/1981 | Orban |
| 4,366,349 A | 12/1982 | Adelman |
| 4,396,806 A | 8/1983 | Anderson |
| 4,454,609 A | 6/1984 | Kates |
| 4,630,304 A | 12/1986 | Borth et al. |
| 4,630,305 A | 12/1986 | Borth et al. |
| 4,700,361 A | 10/1987 | Todd et al. |
| 4,701,953 A | 10/1987 | White |
| 4,852,175 A | 7/1989 | Kates |
| 5,027,410 A | 6/1991 | Williamson et al. |
| 5,029,217 A | 7/1991 | Chabries et al. |
| 5,388,185 A | 2/1995 | Terry et al. |
| 5,479,560 A | 12/1995 | Mekata |
| 5,742,689 A * | 4/1998 | Tucker et al. .................. 381/17 |
| 5,793,703 A * | 8/1998 | Shippey ........................ 367/88 |

OTHER PUBLICATIONS

Andrew J. Lotto, Keith R. Kluender, Lori L. Holt, "Perceptual compensation for coarticulation by Japanese quail (Coturnix coturnix japonica)," J. Acoust. Soc. Am., vol. 102, No. 2, Pt. 1, Aug. 1997, pp. 1134–1140. (Acoustical Society of America).

Lori L. Holt, Andrew J. Lotto, Keith R. Kluender, "Neighboring Spectral Content Influences Vowel Identification," J. Acoust. Soc. Am., vol. 108, No. 2, Aug. 2000, pp. 710–722 (Acoustic Society of America).

* cited by examiner

SPECTRAL ENHANCEMENT OF ACOUSTIC SIGNALS TO PROVIDE IMPROVED RECOGNITION OF SPEECH

REFERENCE TO RELATED APPLICATION

This application claims the benefit of provisional application No. 60/153,411, filed Sep. 10, 1999, the disclosure of which is incorporated by reference.

This invention was made with United States government support awarded by the following agency: NSF Grant No. 9258482. The United States government has certain rights in this invention.

FIELD OF THE INVENTION

This invention pertains generally to the field of audio signal processing and particularly to hearing aids and speech recognition.

BACKGROUND OF THE INVENTION

Individuals with normal hearing are able to perceive speech in the face of extreme context-sensitivity resulting from coarticulation. The ability of listeners to recover speech information, despite dramatic articulatory and acoustic assimilation, is remarkable and central to understanding speech perception. The degree to which listeners perceptually accommodate articulatory constraints often has encouraged perceptual theories that assume relatively detailed reference to articulatory acts themselves, either with respect to general theoretical commitments, or with appeal to specialized speech perception processes unique to humans and to vocal tracts. In each case, correspondences between perception and production are typically taken as evidence of perception of articulatory acts per se. Some approaches have been to appeal to tacit knowledge of coarticulatory acts or their acoustic consequences, and such knowledge-based processes can be viewed as more (e.g., Repp, B. H., "Phonetic Trading Relations and Context Effects: New Evidence for a Speech Mode of Perception," Psychological Bulletin, Vol. 92, 1982, pp. 81–110.) or less (e.g., Diehl, R. L. & Kluender, K. R., "On Categorization of Speech Sounds," Stevan Harnad (Ed.), Categorical Perception, Oxford University Press, 1987, pp. 226–253) specific to speech.

Lack of invariance in the relation between fundamental linguistic units—phonemes—and attributes of the acoustic signal poses a central problem in understanding the nature of speech perception. The basic problem is that there seem to exist few or no unitary attributes in the acoustic signal that uniquely specify particular phonemes. The prime culprit for this state of affairs is coarticulation of speech sounds. Coarticulation refers to the spatial and temporal overlap of adjacent articulatory activities. This is reflected in the acoustic signal by severe context-dependence; acoustic information specifying one phoneme varies substantially depending on surrounding phonemes. One of the more widely described cases for such context dependence concerns the realization of the phonemes /d/ and /g/ as a function of preceding liquid (Mann, V. A., "Influence of Preceding Liquid in Stop-Consonant Perception," Perception & Psychophysics, Vol. 28, 1980, pp. 407–412.) or fricative (Mann, V. A. & Repp, B. H., "Influence of Preceding Fricative on Stop Consonant Perception," Journal of the Acoustical Society of America, Vol. 69, 1981, pp. 548–558). Perception of /d/ as contrasted with perception of /g/, is largely signaled by the onset frequency and frequency trajectory of the third formant (F3). In the context of a following /a/, a higher F3 onset encourages perception of /da/ while a lower onset results in perception of /ga/. The onset frequency of the F3 transition also can vary as a function of the preceding consonant. For example, F3-onset frequency for /da/ is higher following /al/ in /alda/ relative to when following /ar/ in /arda/. The offset frequency of F3 is higher for /al/ owing to a more forward place off articulation and lower for /ar/. Perception of /da/ and /ga/ has been shown to be affected by the composition of preceding acoustic information in a fashion that accommodates these patterns in production. For a series of synthesized consonant-vowel syllables (CVs) varying in onset characteristics of the third formant (F3) and varying perceptually from /da/ to /ga/, subjects are more likely to perceive /da/ when preceded by the syllable /ar/, and to perceive /ga/ when preceded by /al/ (Mann, V. A., "Influence of Preceding Liquid in Stop-Consonant Perception," Perception & Psychophysics, Vol. 28, 1980, pp. 407–412). In subsequent studies, the effect has been found for speakers of Japanese who cannot distinguish between /l/ and /r/ (Mann, V. A., "Distinguishing Universal and Language-Dependent Levels of Speech Perception: Evidence from Japanese Listeners' Perception of English "l" and "r," Cognition, Vol. 24, 1986, pp. 169–196) and for prelinguistic infants (Fowler, C. A., Best, C. T. & McRoberts, G. W., "Young Infants' Perception of Liquid Coarticulatory Influences on Following Stop Consonants," Perception & Psychophysics, Vol. 48, 1990, pp. 559–570). The important point is that, for the very same stimulus with F3 onset intermediate between /da/ and /ga/, the percept is altered as a function of preceding context. Listeners perceive speech in a manner that suggests sensitivity to the compromise between production of neighboring phonetic units.

Different theoretical perspectives provide alternative accounts for how acoustic effects of coarticulation are disambiguated in perception. One approach has been to search harder for invariant attributes in the signal that correspond to phonetic features, and hence phonemes (e.g. Stevens, K. N. & Blumstein, S. E., "The Search for Invariant Acoustic Correlates of Phonetic Features," P. D. Eimas & J. L. Miller (Ed.), Perspectives in the Study of Speech, Hillsdale, N.J.: Erlbaum, 1981). To date, this approach has yielded mixed results with more recent efforts being directed to relatively modest features of the acoustic signal that may seem likely to have slim prospects for survival under noisy conditions typical to speech communication. Further, it is unlikely that invariants exist to explain the aforementioned perceptual phenomenon when one considers the fact that the exact same acoustic information is perceived differently within different contexts. Another tack can be found in Motor Theory (e.g. Liberman, A. M. & Mattingly, I. G., "The Motor Theory of Speech Perception Revisited," Cognition, Vol. 21, 1985, pp. 1–36) which holds that phonetic perception is the perception of the speech gestures and that processes specific to humans recover gestural invariants not apparent in the acoustic signal. Because the lack of invariance in the acoustic signal is the consequence of variability in articulator movements, later versions of this theory suggest that it is intended gestures which are detected.

A third approach is that of Direct Realism (e.g. Fowler, C. A., "An Event Approach to the Study of Speech Perception from a Direct-Realist Perspective," Journal of Phonetics, Vol. 14, 1986, pp. 3–28). Direct Realism is a general theory for all senses holding that perception is an act by which properties of the physical world that are significant to a perceiver, "distal events," are directly recovered without intermediate construction. For speech perception, distal events are held to be linguistically relevant articulations of the vocal tract. In terms of what one desires in a broad theoretical framework, Direct Realism may be the most general, elegant, and internally consistent theory. Perhaps the most critical concern with regard to this approach, however, is that one must be able to solve the "inverse problem." In order to recover a unique distal event in any modality, the perceiver has only the physical energy available to sensory receptors. Independent of classic concerns regarding the extent to which one should view this source of information as rich or impoverished, what must be true is that there is sufficient information to successfully make the inverse transformation to a unique distal event. This requires the existence of some sort of invariant in the signal, perhaps an invariant specified as a function of time. In the absence of an invariant, the best one can do is define some set of possible distal events. Physical acoustic invariants signaling phonemes have not been easy to come by, and Fowler, C. A., "Invariants, Specifiers, Cues: An Investigation of Locus Equations as Information for Place of Articulation," Perception & Psychophysics, Vol. 55, 1994, pp. 597–610 has provided evidence that one recent candidate, locus equations (e.g., Sussman, H., "Neural Coding of Relational Invariance in Speech: Human Language Analogs to the Barn Owl," Psychological Review, Vol. 96, 1989, pp. 631–642 and Sussman, H., "The Representation of Stop Consonants in Three-Dimensional Acoustic Space," Phonetica, Vol. 48, 1991, pp. 18–31), does not provide an invariant for place of articulation. Recovery of articulatory movement from speech acoustics has proven quite difficult.

There has been a good deal of effort made to recover articulatory gestures from the physical acoustic waveform. Often as part of an effort to build speech-recognition machines, these efforts are founded on the hope that greater success at overcoming the problem of lack of invariance may be found through specification of articulatory sources. In general, the history of these efforts can be summarized in the following manner (for review see McGowan, R. S., "Recovering Articulatory Movement from Formant Frequency Trajectories Using Task Dynamics and a Genetic Algorithm: Preliminary Model Tests," Speech Communication, Vol. 14, 1994, pp. 19–48; Schroeter, J. & Sondhi, M. M., "Speech Coding Based on Physiological Models of Speech Production," S. Furui & M. M. Sondhi (Eds.), Advances in Speech Signal Processing, New York: Marcel Dekker, Inc. 1992). Early efforts attempting to use limited acoustic information such as the first three-formant frequencies to derive the area function of the vocal tract were not successful because multiple area functions could be specified by the same waveform. More recent efforts have been more successful to the extent that they incorporated more specific constraints on the nature of the vocal tract together with dynamic and kinematic information. The marriage of these two sources of information is critical. Kinematics alone do not help to recover articulatory acts, i.e., solve for the inverse. This is because, if one begins with a large or infinite set of potential sound sources at time $t_1$, introducing a second large set of potential sources at $t_2$ does little or nothing in the way of narrowing the set of possible sources, let alone permit specification of a single distal event. To the extent that more recent efforts to recover articulatory movement from acoustics have been successful, they have succeeded by virtue of introducing detailed speech-specific constraints on the nature of transformations that can be made as a function of time.

McGowan, R. S., "Recovering Articulatory Movement from Formant Frequency Trajectories Using Task Dynamics and a Genetic Algorithm: Preliminary Model Tests," Speech Communication, Vol. 14, 1994, pp. 19–48, used a task dynamic model (Saltzman, E., Task-Dynamic Coordination of the Speech Articulators: A Preliminary Model," Experimental Brain Research, Vol. 15, 1986, pp. 129–144; Saltzman, E. L. & Kelso, J. A. S., "Skilled Actions: A Task Dynamic Approach," Psychological Review, Vol. 94, 1987, pp. 84–106) driving six vocal tract variables with transformations between tract variables and articulators derived from an articulatory model (Mermelstein, P., "Articulatory Model for the Study of Speech Production," Journal of the Acoustical Society of America, Vol. 53, 1973, pp. 1070–1082). McGowan, R. S. & Rubin, P. E., "Perceptual Evaluation of Articulatory Movement Recovered from Acoustic Data," Journal of the Acoustical Society of America, Vol. 96 (5 pt. 2), 1994, p. 3328, exploited a genetic learning algorithm to discover relations between task-dynamic parameters and speech acoustics for six utterances by a single talker. Results were somewhat mixed in that, while the model got many things right, errors persisted and McGowan, R. S., "Recovering Articulatory Movement from Formant Frequency Trajectories Using Task Dynamics and a Genetic Algorithm: Preliminary Model Tests," Speech Communication, Vol. 14, 1994, pp. 19–48, notes that future applications likely require customization of the model to individual talkers. Related efforts continue to be productive (see, e.g., Schroeter, J. & Sondhi, M. M., "Speech Coding Based on Physiological Models of Speech Production," S. Furui & M. M. Sondhi (Eds.), Advances in Speech Signal Processing, New York: Marcel Dekker, Inc. 1992), but one point is becoming increasingly clear. The extent to which these attempts to solve the inverse problem are successful seems to depend critically upon models engendering highly-realistic details of sound production specific to human vocal tracts, and often to a single human vocal tract. Although some of the efforts to recover vocal tract movements from the acoustic signal have been conducted in the desire for effective machine speech recognition, thus far these attempts have been less successful than straightforward engineering approaches that exploit powerful computers and algorithms to search through hundreds of thousands of templates. Notably, successful template approaches require practice for adjustment to individual talkers.

As noted above, perception of syllable-initial /d/ and /g/ can be influenced by the composition of preceding acoustic information such that, for a series of synthesized consonant-vowel syllables (CVs) varying in onset characteristics of F3 and varying perceptually from /da/ to /ga/, subjects are more likely to perceive /da/ when preceded by the syllable /ar/, and to perceive /ga/ when preceded by /al/. The received interpretation of findings that perceptual performance corresponds with acoustic consequences of producing /da/ and /ga/ following /ar/ and /al/ has been that listeners are somehow sensitive to articulatory implementation. Several experiments have been conducted to assess the degree to which these perceptual effects are specific to qualities of articulatory sources, and whether a simple general process such as perceptual contrast may play a significant role.

Mann, V. A., "Influence of Preceding Liquid in Stop-Consonant Perception," Perception & Psychophysics, Vol. 28, 1980, pp. 407–412, concluded that the perceptual effect results from a mechanism specialized to compensate for vocal tract constraints through the use of "tacit reference to the dynamics of speech production." Four experiments were conducted to test the plausibility of general auditory processes in accounting for these effects, and each is described in greater detail in Lotto, A. J. & Kluender, K. R., "General Contrast Effects in Speech Perception: Effect of Preceding Liquid on Stop Consonant Identification," Perception & Psychophysics, Vol. 60, 1998, pp. 602–619. In three experiments, series of CV stimuli varying in F3-onset frequency /da-ga/ were preceded by speech versions or nonspeech analogues of /al/ and /ar/. The effect of liquid identity on stop-consonant labeling maintained when the preceding VC was produced by a female speaker and the CV was modeled after a male speaker's production. Labeling boundaries also shifted when the CV was preceded by a sine-wave glide modeled after F3 characteristics of /al/ and /ar/. This effect maintained even when the preceding sine wave was of constant frequency equal to the offset frequency of F3 from a natural production. Finally, four Japanese quail (*Coturnix coturnix japonica*) were used to test further the generality of this effect (Lotto, A. J., Kluender, K. R. & Holt, L. L., "Perceptual Compensation for Coarticulation by Japanese Quail (*Coturnix cotrunix japonica*)," Journal of the Acoustical Society of America, Vol. 102, 1997, pp. 1134–1140). Birds were trained by operant procedures to peck a lighted key when presented with either the syllable /da/ or /ga/ and to refrain from pecking it when presented with the alternative syllable (/ga/ or /da/). They were presented with test disyllables consisting of the synthesized /al/ or /ar/ followed by one of the ambiguous intermediary members of the /da-ga/ series. Avian responses to intermediate novel test stimuli indicate an effect of the preceding syllable like that for human listeners such that 'labeling' shifted to more /ga/ responses following /al/ and more /da/ responses following /ar/. For all of these findings, when energy preceding the energy signaling the consonant is of higher frequency (/al/, FM glide, pure tone), the percept more often corresponds to the consonant with the lower frequency F3 (/ga/). This suggests that spectral contrast plays an important role.

Coarticulation with consonants also can exert a powerful influence on the acoustic realization of vowels. Isolated vowels are extremely rare or nonexistent in fluent speech, and many studies have addressed the far more typical cases of vowels produced within consonantal contexts. Lindblom, B. E. F., "Spectrographic Study of Vowel Reduction," Journal of the Acoustical Society of America, Vol. 35, 1963, pp. 1773–1781, conducted spectrographic measurements of naturally produced CVCs and found that, relative to formant-frequency values for vowels produced in isolation, formant values toward the centers of the CVCs were lower when consonants were labial and higher when consonants were palato-alveolar. Lindblom, B. E. F. and Studdert-Kennedy, M., "On the Role of Formant Transitions in Vowel Recognition," Journal of the Acoustical Society of America, Vol. 42, 1967, pp. 830–843, investigated the role of consonant-vowel transitions for perception of vowels in CVCs. They synthesized three series of 240-ms duration CVC stimuli with vowels varying from /U/ to /I/. One series consisted of steady-state vowels. The other two series had continuously varying formant frequencies appropriate for /wVw/ and for /jVj/. The /wUw-wIw/ series of syllables began and ended with lower F2 and F3 frequencies, and the /jVj/ series began and ended with higher F2 and F3 frequencies. More vowels were perceived as /I/ in the /wVw/ context and fewer as /I/ in the /jVj/ context as would be predicted if perception of vowels was complementary to observed regularities in production. Much later, Nearey, T. M., "Static, Dynamic, and Relational Properties in Vowel Perception," Journal of the Acoustical Society of America, Vol. 85, 1989, pp. 2088–2113, extended the positive findings to /dVd/ and /bVb/ syllables with vowel sounds ranging from /o/-/Λ/ and /Λ/-/ɛ/. Again, contrast plays a role. When preceding energy is of higher F2 frequency (/d/), the following vowel is more likely to be perceived as a lower frequency vowel.

There are a large number of experimental precedents in the psychoacoustics literature for spectral contrast effects such as those found for coarticulated speech sounds. Most often, these effects have been described as "auditory enhancement." Summerfield and his colleagues (Summerfield, Q., Haggard, M. P., Foster, J., & Gray, S. "Perceiving vowels from uniform spectra: Phonetic exploration of an auditory aftereffect," Perception & Psychophysics, Vol. 35, 1984, pp. 203–213) showed that, when a uniform harmonic spectrum is preceded by a spectrum that is complementary to a particular vowel with troughs replacing peaks and vice versa, listeners reported hearing a vowel during presentation of the uniform spectrum. And, a precursor uniform harmonic spectrum enhances vowel percepts when defined by an harmonic spectrum with only very modest spectral peaks (2–5 dB) (Summerfield, Q., Sidwell, A., & Nelson, T. "Auditory enhancement of changes in spectral amplitude," Journal of the Acoustical Society of America, Vol. 81, 1987, pp. 700–707.) One can describe all of the effects in terms of perception being predicated on the basis of spectral contrast between two complex sounds.

Perceiving vowel sounds in uniform spectra (following appropriate complementary spectral patterns) has a well-known precedent in psychoacoustics. If just one member of a set of harmonics of equal amplitude is omitted from a harmonic series and is reintroduced, then it stands out perceptually against the background of the pre-existing harmonics (Green, D. M., McKey, M. J., & Licklider, J. C. R. "Detection of a pulsed sinusoid in noise as a function of frequency," Journal of the Acoustical Society of America, Vol. 31, 1959, pp. 1146–1152; Cardozo, B. L. "Ohm's Law and masking," Institute for Perception Research Annual Progress Report, Vol. 2, 1967, pp. 59–64; Viemeister, N. F. "Adaptation of masking," G. van den Brink & F. A. Bilsen (Eds.), Psychophysical, Physiological, and Behavioral Studies in Hearing, Delft University Press, 1980, pp. 190–197; Houtgast, T. "Psychophysical evidence for lateral inhibition in hearing," Journal of the Acoustical Society of America, Vol. 51, 1972, pp. 1885–1894.) Viemeister (Viemeister, N. F. "Adaptation of masking," G. van den Brink & F. A. Bilsen (Eds.), Psychophysical, Physiological, and Behavioral Studies in Hearing, Delft University Press, 1980, pp. 190–197) demonstrated that the threshold for detecting a tone in an harmonic complex is 10–12 dB lower when the incomplete harmonic complex (missing the target zone) is continuous as compared to when the onset of the inharmonic complex is the same as that for the target zone. This was referred to as an "enhancement effect." McFadden and Wright (McFadden, D., & Wright, B. A. "Temporal decline of masking and comodulation detection differences," Journal of the Acoustical Society of America, Vol. 88, 1990, pp. 711–724) investigated comodulation detection differences using flanking bands that were gated either simultaneously with the signal band or gated at varying times prior to signal onset. They found that signal detectability improved by as much as 25 dB when flanking 100-Hz bands of noise preceded the signal by durations of 5 to 700 ms. All these results are consonant with the findings described above concerning effects of preceding formants on perception of vowels in CVC syllables. Enhancement effects also operate across silent intervals like those commonly observed corresponding to vocal-tract closure in the cases of /alda-alga/ and /arda-arga/. McFadden and Wright (McFadden, D., & Wright, B. A. "Temporal decline of masking and comodulation detection differences," Journal of the Acoustical Society of America, Vol. 88, 1990, pp. 711–724) found that, for flanking bands preceding signal presentation, a silent interval as long as 355 ms between flanking bands and the flanking bands plus signal was insufficient to fully attenuate the enhancing effects of spectral energy away from the signal to be detected. Enhancement effects maintain across silent intervals at least as long as those encountered in connected speech.

There are several potential explanations for these effects. Summerfield (Summerfield, Q., Haggard, M. P., Foster, J., & Gray, S. "Perceiving vowels from uniform spectra: Phonetic exploration of an auditory aftereffect," Perception & Psychophysics, Vol. 35, 1984, pp. 203–213; Summerfield, Q., Sidwell, A. & Nelson, T. "Auditory enhancement of changes in spectral amplitude," Journal of the Acoustical Society of America, Vol. 81, 1987, pp. 700–707) suggested that the effect may be rooted in peripheral sensory adaptation. However, Viemeister and Bacon (Viemeister, N. F., & Bacon, S. P. of America, Vol. 71, 1982, pp. 1502–1507) showed that, not only was an "enhanced" target tone more detectable, the tone also served as a more effective masker of the following tone. They suggested that suppression must be included in an adaptation scenario to place it in closer accord to this finding. Different frequency components of a signal serve to suppress one another, and Viemeister and Bacon suggested that non-signal channels are adapted such that their ability to suppress the signal is attenuated. This explanation is consistent with studies of two-tone suppression which has been cast as an instance of lateral inhibition in hearing, (Houtgast, T. "Psychophysical evidence for lateral inhibition in hearing," Journal of the Acoustical Society of America, Vol. 51, 1972, pp. 1885–1894.) Investigators have argued that suppression helps to provide sharp tuning (e.g., Wightman, F., McKee, T., & Kramer, M. "Factors influencing frequency selectivity in normal and hearing-impaired listeners," E. F. Evans & J. P. Wilson (Eds.) Psychophysics and Physiology of Hearing, Academic Press, 1977, pp. 295–310; Festen, J. M., & Plomp, R. "Relations between auditory functions in normal hearing," Journal of Acoustical Society of America, Vol. 70, 1981, pp. 356–369) and with respect to speech perception, Houtgast (Houtgast, T. "Auditory analysis of vowel-like sounds," Acustica, Vol. 31, 1974, pp. 320–324) has argued that this process serves to sharpen the neural projections of a vowel spectrum in a fashion that effectively provides formant extraction. Summerfield (Summerfield, Q., Haggard, M. P., Foster, J., & Gray, S. "Perceiving vowels from uniform spectra: Phonetic exploration of an auditory afereffect." Perception & Psychophysics, Vol. 35, 1984, pp. 203–213; Summerfield, Q., Sidwell, A., & Nelson, T. "Auditory enhancement of changes in spectral amplitude," Journal of the Acoustical Society of America, Vol. 81, 1987, pp. 700–707) suggests that either simple adaptation or adaptation of suppression could serve to enhance changes in spectral regions where previously there has been relatively little energy.

There also exist several neurophysiological observations that bear upon enhancement effects. In particular, a number of neurophysiological studies of auditory nerve (AN) recordings (e.g., Smith, R. L. & Zwislocki, J. J., "Responses of Some Neurons of the Cochlear Nucleus to Tone-Intensity Increments," Journal of the Acoustical Society of America," Vol. 50, 1971, pp. 1520–1525; Smith, R. L., "Adaptation, Saturations, and Physiological Masking in Single Auditory-Nerve Fibers," Journal of the Acoustical Society of America, Vol. 65, 1979, pp. 166–178; Smith, R. L., et al., "Sensitivity of Auditory-Nerve Fibers to Changes in Intensity: A Dichotomy Between Decrements and Increments," Journal of the Acoustical Society of America, Vol. 78, 1985, pp. 1310–1316) strongly imply a role for peripheral adaptation. More recently, Delgutte, B., et al., "Neural Encoding of Temporal Envelope and Temporal Interactions in Speech," W. Ainsworth & S. Greenberg (Eds.), Auditory Basis of Speech Perception, pp. 1–9, European Speech Communication Association 1996, (see also Delgutte, B., "Representation of Speech-Like Sounds in the Discharge Patterns of Auditory Nerve Fibers," Journal of the Acoustical Society of America, Vol. 68, 1980, pp. 843–857; Delgutte, B., "Analysis of French Stop Consonants with a Model of the Peripheral Auditory System," J. S. Perkell & D. H. Klatt (Eds.), Invariance and Variability of Speech Processes, pp. 131–177, Erlbaum: Hillsdale, N.J. 1986; and, Delgutte, B., "Auditory Neural Processing of Speech," W. J. Hardcastle & J. Laver (Eds.), The Handbook of Phonetic Sciences, Oxford: Blackwell, 1996, pp. 507–538; Delgutte, B. & Kiang, N. Y. S., "Speech Coding in the Auditory Nerve IV: Sounds with Consonant-Like Dynamic Characteristics," Journal of the Acoustical Society of America," Vol. 75, 1984, pp. 897–907), have established the case for a much broader role of peripheral adaptation for perception of speech. He notes that peaks in AN discharge rate correspond to spectro-temporal regions that are rich in phonetic information, and that adaptation increases the resolution with which onsets are represented. This role of adaptation for encoding onset information is consistent with earlier observations noted above. Perhaps most important to questions addressed in this application, Delgutte notes neurophysiological evidence that "adaptation enhances spectral contrast between successive speech segments." This enhancement arises because a fiber adapted by stimulus components close to its CF is relatively less responsive to subsequent energy at that frequency, while stimulus components not present immediately prior are encoded by fibers that are unadapted—essentially the same process offered by psychoacousticians but now grounded to physiology. Delgutte also notes that adaptation takes place on many timescales. In general, adaptation effects are sustained longer with increasing level in the auditory system. Some of the temporally extended psychoacoustic effects described above may be less likely to have very peripheral (auditory nerve) origin. Most recently, Scutt, M. J., et al., "Psychophysical and Physiological Responses to Signals Which are Enhanced by Temporal Context," Abstracts of the 20$^{th}$ Midwinter Meeting of the Association for Research in Otolaryngology, 1997, p. 188, report evidence of enhancement in the cochlear nucleus consistent with adaptation of inhibition (suppression); however, the time course at that level appears too short to accommodate the full range of psychophysical findings.

Taken together, these precedents suggest that simple adaptation and/or adaptation of suppression provide appealing explanation for results from experiments described above. With respect to peripheral sensory adaptation/suppression being a potential candidate for explaining perceptual contrast effects found thus far, there is one piece of potentially contradictory data. Mann, V. A. & Liberman, A. M., "Some-Differences Between Phonetic and Auditory Modes of Perception," Cognition, Vol. 14, 1983, pp. 211–235, found that, when only F3 transitions from a series of stimuli ranging from /da/ to /ga/ were presented to one ear with the rest of the stimulus complex presented to the other ear in a discrimination task, discrimination peaks shifted depending upon whether /al/ or /ar/ was presented as the first syllable. Based on this effect of information from the contralateral ear, Mann and Liberman argued that peripheral auditory explanations must be ruled out. One problem with this interpretation is that F2 offsets for /ar/ syllables were of higher frequency than F2-offsets for /al/ syllables. It is known that identification of /da-ga/ syllables is affected by the onset frequency of F2 with higher F2 favoring /ga/ percepts (Delattre, P. C., et al., "Acoustic Loci and Transitional Cues for Consonants," Journal of the Acoustical Society of America, Vol. 27, 1955, pp. 769–773). This being the case, monaural frequency contrast of F2 would predict exactly the pattern of response observed: more /ga/ (high F2) responses following /al/ (low F2). Because energy for F2 for both syllables was delivered to the same ear, these results cannot rule out a monaural peripheral explanation. In addition, it was already noted that temporally extended enhancement effects are likely to have a neurophysiological origin beyond AN. Owing to the fact that—only two synapses away from the hair cell—substantial contralateral connections converge at the inferior colliculus (and superior olive), one must be cautious concluding the level of the auditory system at which some process occurs on the basis of dichotic studies.

What can be concluded is that there is substantial evidence from many sources suggesting how adaptation and suppression can support perceptual contrast (enhancement). Beyond the efforts of Summerfield and his colleagues, however, very little has been made of this ubiquitous effect as reflected in perception of speech. Furthermore, if that understanding can be exploited by devices that improve communication of persons with hearing impairment, perceptual contrast need not provide a complete account in order to provide a very useful component. The approach is to exploit simple contrastive processes through signal processing in a fashion that expands the perceptual space, making adjacent speech sounds more perceptually distinctive. Because coarticulation is always assimilatory, no matter what the phonetic distinction, contrast will always serve to undo such assimilation. Concretely, if coarticulatory (assimilative) effects of preceding vowel /u/ is to make a /g/ more /b/-like (lower F2, less distinct from /b/), then contrast will serve to make /g/ perceptually less /b/-like and more like a modal /g/. One also can consider the converse case for /b/ following /i/. Overall, contrast always serves to perceptually "drive sounds away" from their neighbors (in this case along the F2 dimension) following assimilative effects of preceding speech sounds. If this process can be enhanced through hearing aids, perception may be improved in ways not possible with typical amplification strategies.

Cochlear hearing impairment is associated with reduced frequency selectivity and with loudness recruitment. These two factors are not independent. Elevated thresholds for hearing impaired listeners result in limited dynamic range. Once amplification has been introduced to make the signal suprathreshold, the system is in a compressive state, leading to "spectral smearing" (Moore, B. C. J., et al., "Simulations of the Effect of Hearing Impairment on Speech Perception," W. Ainsworth & S. Greenburg, Auditory Basis of Speech Perception, European Speech Communication Association, pp. 1–9, 1996). The consequences of this deficiency in spectral definition seem to be more severe for some aspects of the speech signal than for others. As might be expected, for example, amplitude envelope shapes suffer least when audibility is improved with amplification, probably owing to the ability to encode such information in temporal firing patterns irrespective of spectral detail. By contrast, most types of spectral information are perceived poorly even when audibility is provided (e.g., Revoile, S. G., et al., "Spectral Cues to Perception of /d,n,l/ by Normal and Impaired-Hearing Listeners," Journal of the Acoustical Society of America, Vol. 90, pp. 787–793, 1991; Summers, V. & Leek, M. R., "Frequency Glide Discrimination in the F2 Region by Normal and Hearing-Impaired Listeners," Journal of the Acoustical Society of America, Vol. 97, pp. 3825–3832, 1995; Turner, C. W., et al., "Formant Transition Duration and Speech Recognition in Normal and Hearing-Impaired Listeners," Journal of the Acoustical Society of America, Vol. 101, pp. 2822–2838, 1997). Additional amplification not only does not help in these cases, but additional increments in amplification can even lead to decreased speech recognition (Hogan, C. & Turner, C. W., "High-Frequency Amplification: Benefits for Hearing-Impaired Listeners," Journal of the Acoustical Society of America, Vol. 104, pp. 411–432, 1998; Rankovic, C. M., "An Application of the Articulation Index to Hearing Aid Fitting," Journal of Speech and Hearing Research, Vol. 34, pp. 391–402, 1991).

SUMMARY OF THE INVENTION

The present invention provides a method and apparatus for enhancing an auditory signal. The present invention employs a process which enhances spectral differences between sounds in a fashion mimicking that of human auditory systems. Implementation imitates neuroprocesses of adaptation, suppression, adaptation of suppression, and descending inhibitory pathways. Thus, the present invention serves to make sounds, particularly speech sounds, more distinguishable.

In accordance with the present invention, an input auditory signal is divided into a plurality of spectral channels. This may be accomplished, for example, by applying the input auditory signal to a bank of gammatone or Quadrature Mirror Filters. An output gain for each channel is derived based on the time varying history of energy in the channel. The magnitude of the output gain thus derived is preferably inversely related to the history of energy in the channel. For example, the output gain may be derived by determining a weighted energy history of the channel, converting the weighted energy history into an RMS history weighting value, and subtracting the RMS history weighting value from unity to determine the output gain for the channel. The output gain for each channel preferably also takes into consideration the time varying history of energy in neighboring spectral channels. Thus, the output gain for each channel may preferably be derived by subtracting the ratio of the RMS history weighting value for the channel to a sum of RMS history weighting values for neighboring channels from unity to determine the output gain for the channel. The output gain thus derived is applied to the channel to form a plurality of modified spectral channel signals. The plurality of modified spectral channel signals are combined to form an enhanced output auditory signal.

The present invention is particularly applicable to use in electronic hearing aid devices for use by the hearing impaired, particularly for purposes of enhancing the spectrum such that impaired biological signal processing in the auditory brain stem is restored. An electronic hearing aid device incorporating the present invention may include a microphone for receiving sound and converting it into electrical signals, appropriate amplification and filtering, an analog to digital converter, a signal processor, such as a digital signal processor, implementing signal processing for enhancing the auditory signal in accordance with the present invention, a digital to analog converter, output side filters and amplifiers, and a speaker for providing the enhanced auditory signal to a wearer of the hearing aid device.

The present invention may be employed in any system wherein it is desired to make sounds, particularly speech sounds, more distinguishable. For example, the present invention may be incorporated into a computer speech recognition system. Such a system may include a microphone that converts a sound to an analog signal presented to an amplifier and filter, the output of which is provided to an analog to digital converter, which provides digital data to a signal processor, wherein processing in accordance with the present invention to enhance the auditory signal as provided. Alternatively, recorded signal data may be provided from a recording system directly to the signal processor. The output of the signal processor is provided to a speech recognition system, which itself may be implemented in a general purpose computer, with the output of the speech recognition system provided to output devices or to digital storage media.

Further objects, features, and advantages of the present invention will be apparent from the following detailed description taken in conjunction with the accompanying drawings.

DETAILED DESCRIPTION OF THE INVENTION

The present invention provides a method and apparatus for enhancing an auditory signal. For example, the present invention may be employed in electronic hearing aid devices for use by the hearing impaired, particularly for purposes of enhancing the spectrum such that impaired biological signal processing in the auditory brainstem is restored. This process enhances spectral differences between sounds in a fashion mimicking that of non-pathological human auditory systems. Implementation imitates neural processes of adaptation, suppression, adaptation of suppression, and descending inhibitory pathways. The invention serves to make sounds, particularly speech sounds, more distinguishable. Thus, the present invention is applicable to uses other than hearing aids, such as computer speech recognition systems.

The present invention is directed to solve the problem that, for many hearing-impaired listeners, amplification is required to make a signal audible, but because of limited dynamic range, spectral resolution deteriorates at amplified presentation levels. All this is assumed to take place at the cochlea. The invention addresses this problem by manipulation of the spectral composition of the signal to overcome some of the loss of spectral resolution, and to substitute to some extent for additional amplification (which becomes deleterious at higher levels.) The presumed locus for contrast effects is at a level substantially beyond the cochlea, and an auditory signal is appropriately modified in a manner that permits these contrast mechanisms to increase perceptual distinctiveness more centrally. If these contrast mechanisms are intact, and, if the speech spectrum is enhanced in a manner that at least partially circumvents the limited spectral resolution of the impaired periphery, these more central processes can better distinguish speech sounds. Consider the case of a formant that ends with closure silence and begins again (after closure) at a slightly higher or lower frequency. For the impaired ear, there would be no perceived difference in the offset and onset frequencies, as both would be consumed within the same broadened (smeared) frequency channel. Such would not be the case for the non-impaired ear. Instead, contrastive process would serve to "repel" these spectral prominences making them more distinct.

Figure 1:
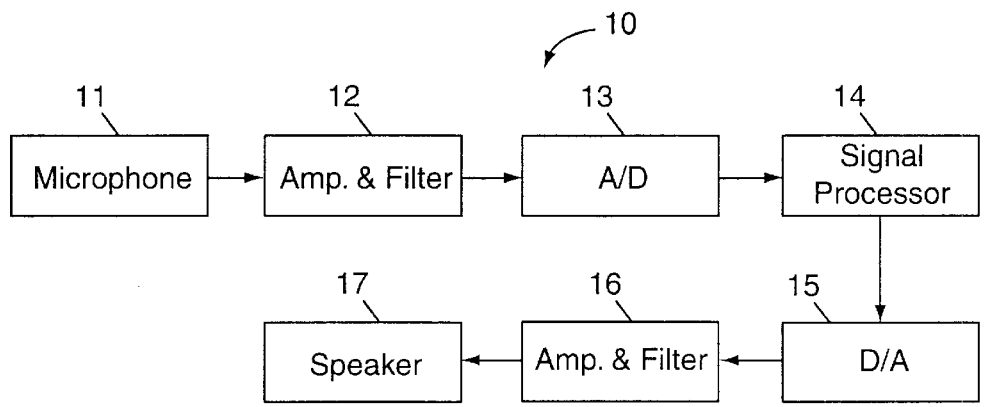
FIG. 1 is a schematic block diagram of an electronic hearing aid device incorporating a signal processor for enhancing an auditory signal in accordance with the present invention.
Figure 2:
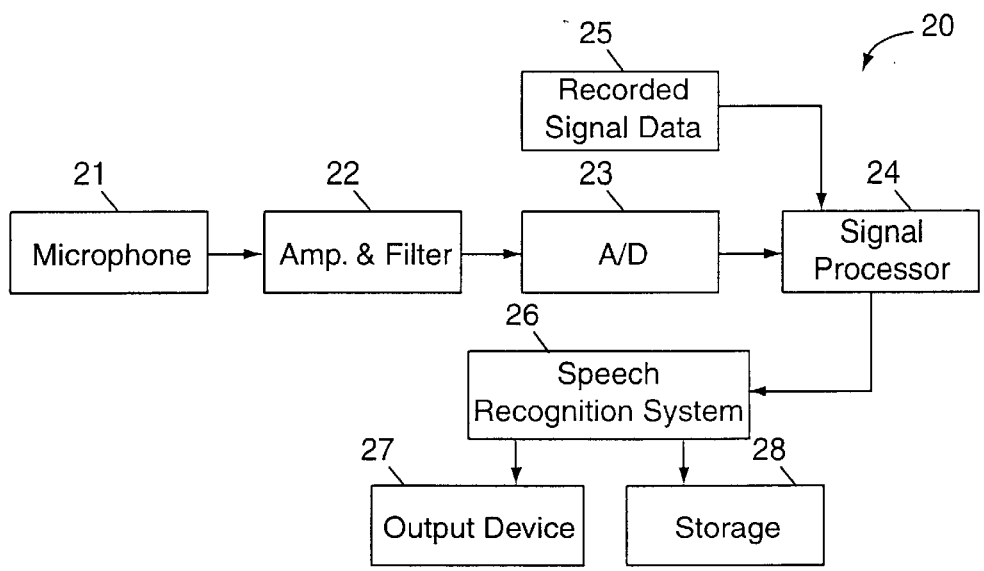
FIG. 2 is a schematic block diagram of a speech recognition system incorporating a signal processor for enhancing an auditory signal in accordance with the present invention.

The invention may be incorporated into a hearing aid apparatus as illustrated at 10 in FIG. 1 or a speech recognition system as illustrated at 20 in FIG. 2. For purposes of illustration, a general hearing aid system 10 includes a microphone 11 for receiving sound and converting it into electrical signals, appropriate amplification and filtering 12, an analog to digital converter 13, a signal processor, such as a digital signal processor 14, which carries out the signal processing in accordance with the invention as described further below, a digital-to-analog converter 15, filter and amplifiers 16, and a speaker 17 which converts the amplified signal to sound for the hearing impaired listener. Similarly, the speech recognition system 20 may receive sound from a microphone 21 that converts the sound to an analog signal presented to an amplifier and filter 22, the output of which is provided to an analog to digital converter 23, which provides digital data to a signal processor, such as a digital signal processor 24, which may be implemented in a general purpose computer. Alternatively, recorded signal data may be provided from a recording system 25 directly to the signal processor 24. The output of the signal processor 24 is provided to a speech recognition system 26, which itself may be a general purpose computer (and the speech recognition system 26 and the signal processor 24 may both be implemented using the same computer), with the output of the speech recognition system 26 provided to output devices 27 (hard copy, video displays, etc.), or to digital storage media 28. The hardware for such systems 10 and 20 is of conventional design and is well known, with present invention being implemented in a signal processor 14 and 24.

In accordance with the invention, adaptive filters may be utilized. The essence of this approach is to shape the spectrum based upon preceding energy that passes through a bank of filters. Frequencies present at time t are attenuated modestly at time t+1, akin to simple adaptation. Consider the case of a single formant traversing frequency. As the formant increases in frequency, the filter successively attenuates energy at lower frequencies through which the spectral prominence has already passed. This will have two consequences. First, the shoulder on the low-frequency side of the formant will be sharpened because that is where most energy was immediately prior. This will serve to "sharpen" the spectrum as compensation for smearing in the impaired ear. Second, the effective frequency (center of gravity) of the formant peak will be skewed away from where the formant had been before. The consequence is that contrast will be imposed on the signal (spreading successive formants apart in frequency). It also is the case that a formant transition will be "accelerated" via this process. Because the filter successively attenuates the low-frequency shoulder, the effective slope of the processed formant steepens. At first, one may suspect that more radical formant transitions cannot be a good thing for hearing-impaired listeners. Surprisingly, however, in a recent study investigating whether hearing-impaired listeners would benefit from longer formant transitions in /ba/-/da/-/ga/ syllables, it has been shown that performance of normal-hearing and hearing-impaired listeners overlapped for the shortest transitions (20 and 40 ms) with performance diverging for the longest transitions (80 ms and greater) owing to decreased performance for hearing-impaired subjects (Turner, C. W., et al., "Formant Transition Duration and Speech Recognition in Normal and Hearing-Impaired Listeners," Journal of the Acoustical Society of America, 1997, pp. 2822–2838).

Various strategies of filtering the signal into multiple bands of appropriate widths may be utilized in accordance with the invention. In one example, a bank of gammatone filters is constructed. Because filter skirts overlap, this method includes biorthogonal reconstruction when filter outputs are recombined. A second strategy uses a large bank of filters based on perfectly reconstructing Quadrature Mirror Filters. The QMF filterbank affords arbitrarily fine analysis in the low-frequency region of the spectrum akin to that afforded by the cochlea. For either filtering strategy, the output gain from this first stage depends upon the time-varying history of energy passing through that filter. This can be conceptualized as a buffer within which the last 30–300 ms of the waveform (passed through that filter) is stored as a vector. This vector is multiplied by a second vector that is a weighting function across time. Any weighting function can be used toward either biological fidelity or practical efficacy. Because the history of the signal passing through a filter is simply a vector of numbers corresponding to sampled amplitude values, the length (duration) can easily be adjusted and the function describing the weighting of energy over time is quite flexible (mathematically arbitrary). This yields a weighted history, and this weighted history of energy is converted to a single RMS value. Convolution is the preferred embodiment for applying the weighting function. The RMS value of the weighted history is then subtracted from unity (1) to yield a gain factor for that channel. Thus, if there was much energy passing through that channel in recent history, the gain factor will be much less than 1. If no energy had passed through that channel, the gain function would be 1. This simple first stage of the process mimics simple adaptation processes because the gain for the signal passing through a filter is smaller when the amount of energy that passed through the same filter in recent history is greater. In some respects, this stage is the same as that used in AGC circuits common to a many hearing aid designs; however, hearing aids with a typical small number of channels (e.g., 4) do relatively little to change spectral properties. What distinguishes this approach is the number and design of filters. This algorithm has been implemented using 50 filters narrower than critical bands. The number of filters may be increased or decreased (bandwidth decreased or increased, respectively) to optimize biological fidelity and/or practical performance criteria. The duration of history also can be varied based upon fidelity or efficacy. For both bandwidth and duration, values initially may be determined on the basis of results from experiments for which frequency range and temporal parameters are investigated.

A second stage of processing in accordance with the invention presents another novel aspect of the approach. Because gain functions always have values $\leq 1$, if all of the gain-adjusted filter outputs are simply summed (followed by biorthogonal reconstruction when filters overlap), the total energy of the output waveform will be substantially less than the input energy. The simplest way to make the output level equal to the input level would be to multiply the output by a value equal to the input divided by the sum of the filter outputs. The present invention provides a more sophisticated method, and permits introduction of a simulation of lateral inhibition in a fashion like that envisioned for suppression by psychoacousticians (e.g., Houtgast, T., "Psychophysical Evidence for Lateral Inhibition in Hearing," Journal of the Acoustical Society of America, 1972, pp. 1885–1894; Viemeister, N. F., & Bacon, S. P., "Forward Masking by Enhanced Components in Harmonic Complexes," Journal of the Acoustical Society of America, 1982, pp. 1502–1507). Instead of balancing input and output levels across the entire bandwidth, the input and output is equated within a "neighborhood" of input filters (e.g., for filter j, j–3 through j+3). The result of equating input and output within a restricted frequency range is that when one filter gain increases, adjacent filter gains decrease. In simulations, this has been shown to serve well to sharpen formant patterns. Empirical results from studies previously described with humans and animals above may be employed to direct the parameters for this second stage of processing. First, experiments that reveal the strength of enhancement across frequencies serve to define the preferred number of adjacent filters in the second stage "neighborhoods." These same studies also serve to determine whether adjacent filters should be included symmetrically about a filter or whether, for example, more filters should be included from lower or higher frequencies. Finally, adjustments to gain in the second stage can be based upon a history of energy, and the interval over which levels could be integrated can be determined by experiments above in which the interval between the precursor and target are manipulated. As is the case for the first stage of the process, these parameters can be adjusted further for greater biological fidelity or practical efficacy.

Figure 3:
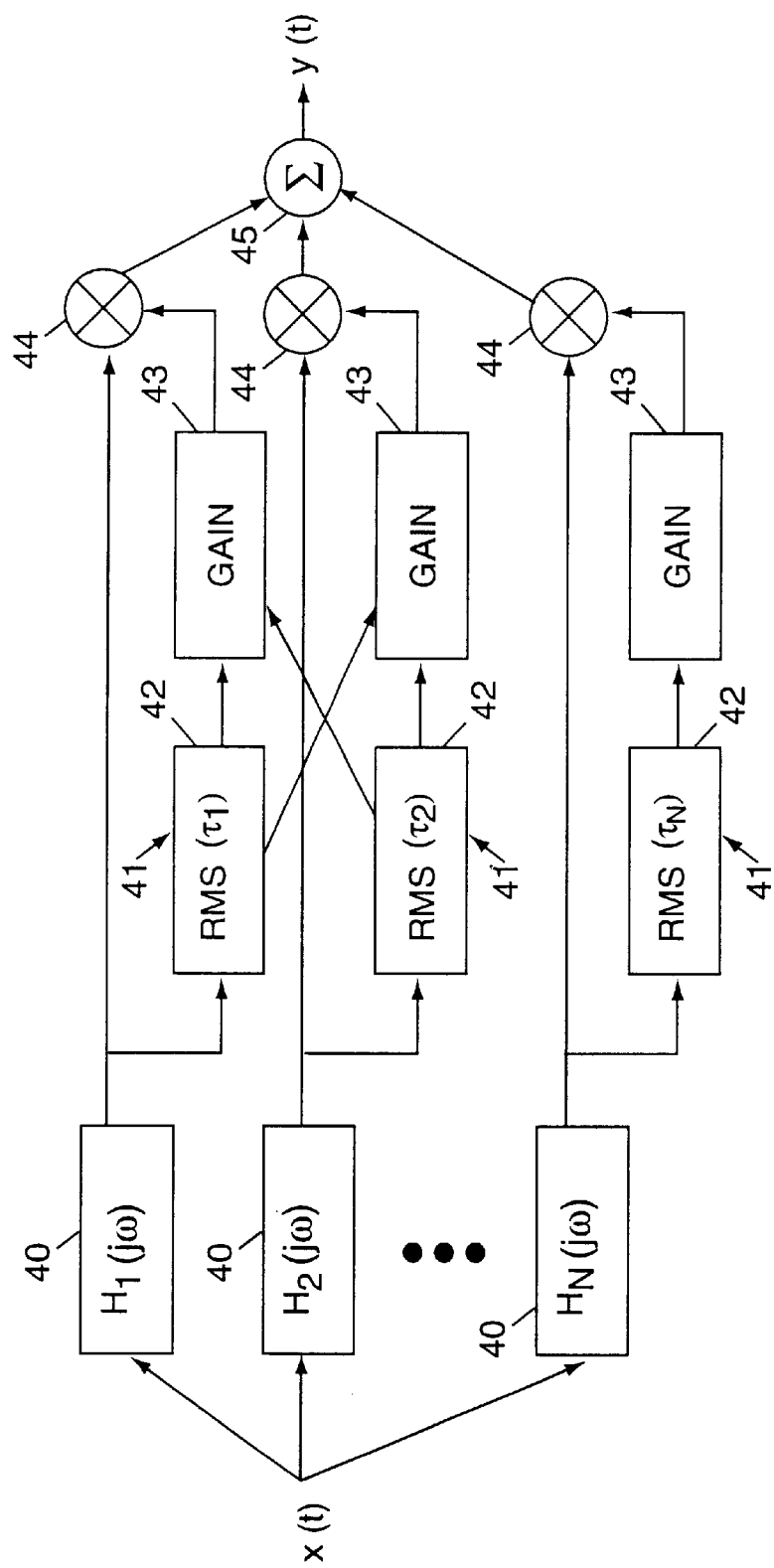
FIG. 3 is a schematic illustration of an exemplary system for enhancing an auditory signal in accordance with the present invention.

A preferred embodiment of signal processing for enhancing an auditory signal in accordance with the present invention is described with reference to FIG. 3. A preferred implementation of a spectral enhancement system in a signal processor 14 or 24 passes a digitized acoustic signal x(t) toga plurality of band-pass filters 40. It is preferred that orthogonal completely-restructuring filters be used. If perfectly reconstructing filters are not used, a set of biorthogonal filters may be used to reconstruct the output signal.

A plurality of automatic-gain-control (AGC) circuits 41 are each associated with one band-pass filter 40. The present invention targets characteristics of the acoustical signal for purposes of enhancement rather than purposes of signal compression. Time-varying gain is applied individually in each band-pass filtered signal, based on the following calculations:

1. The RMS level 42 in each individual ($i^{th}$) frequency band is calculated using a window that is determined by a function of the signal history in each frequency band. This function 42 can be an arbitrary function, but the preferred embodiment is an exponential (increasing or decreasing) or a member of the exponential family. Other weighting functions may be used based on practical experience with actual speech. Examples of other functions include rectangular (flat) and Gaussian (including skewed Gaussian).

2. The gain 43 in each individual ($i^{th}$) frequency band is calculated by subtracting from unity the ratio of the RMS level in the current frequency band to the sum of the RMS levels in neighboring frequency bands. The neighborhood is defined by an arbitrary function. In the preferred embodiment, the neighborhood function is defined by a Gaussian function to mimic lateral interactions found in the auditory brainstem. The gain calculation results in a range of values from zero to unity, ensuring that the gain is well controlled. Additional control of the gain is accomplished by raising the gain to a specified power.

gain($i$)=[1−RMS($i$)/SUM(RMS(neighborhood))]

3. The gain is applied to the signal in each individual frequency band by multiplication 44. The collective effect of the windowed RMS calculation and lateral interactions within frequency neighborhoods results in a form of forward energy suppression specifically designed to enhance the spectrum of the acoustical signal. When an individual frequency band is relatively high in energy in the past, it will tend to suppress its current energy under the condition that is neighboring frequency bands were low in energy. This form of suppression will have the effect of sharpening dynamic modes in the spectrum, while flattening those that are relatively steady-state.

For orthogonal, perfectly reconstructing filters, the output signal is obtained by summing at 45 the individually processed signals in all frequency bands. Otherwise, biorthogonal reconstructing filters will be necessary to synthesize the output signal.

The following is an example of the computational process for such filters which may be implemented in a computer processor using, e.g., Matlab® software.

$f_j$ is the jth orthogonal completely-reconstructing band-pass filter. l is the length of the impulse response.

T is an n×n Toeplitz matrix, where n is the number of frequency channels.

Neighborhoods are defined by nonzero elements of the Toeplitz matrix. Elements do not need to be unity or symmetric.

$T \in \mathfrak{R}^{n \times n}$ h is a history vector of size m+1 derived from an arbitrary function β for i=0:m
      h(i)=β(i)
   end
t=0;
do forever
   t=t+1
   for j=1:n $$y_j(t) = \sum_{i=-l/2}^{l/2} f_j(i) \times input(t-i)$$

$$rms_j(t) = \sqrt{\sum_{i=0}^{m} h(i) \times y_j(t-i)^2}$$

end
   for j=1:n $$gain_j(t) = \left[ 1 - \frac{rms_j(t)}{\sum_{k=1}^{n} T_{jk} \times rms_k(t)} \right]^P$$

$y_j(t) = gain_j(t) \times y_j(t)$ end $$output(t) = \sum_{j=1}^{n} y_j(t)$$

end

Typical parameter settings for a sampling frequency of 8000 Hz:

$l = 128;$     Exponential Function
$m = 1000;$     $\beta = (x) = e^{-x}$
$n = 50;$
$P = 20;$     or Linear function
                  $\beta(x) = ax + b$ $$T = \begin{bmatrix} 1 & 1 & 0 & 0 & \ldots & 0 \\ 1 & 1 & 1 & 0 & \ldots & \vdots \\ 0 & 1 & 1 & 1 & 0 & \vdots \\ 0 & 0 & 1 & 1 & 1 & \vdots \\ 0 & \ldots & 0 & 1 & \ddots & 1 \\ 0 & \ldots & \ldots & \ldots & 1 & 1 \end{bmatrix}$$

It is understood that the present invention is not limited to the specific applications and embodiments illustrated and described herein, but embraces such modified forms thereof as come within the scope of the following claims.

What is claimed is:

1. A method for enhancing an auditory signal, comprising the steps of:
    (a) dividing an input auditory signal into a plurality of spectral channels;
    (b) determining an output gain for each channel based on the time varying history of energy in the channel and wherein the magnitude of the output gain for each channel is inversely related to the history of energy in the channel;
    (c) applying the output gain for each channel to the channel to form a plurality of modified spectral channel signals; and
    (d) combining the plurality of modified spectral channel signals to form an enhanced output auditory signal.

2. The method of claim 1 wherein the step of dividing the input auditory signal into a plurality of spectral channels includes the step of applying the input auditory signal to a bank of gammatone filters.

3. The method of claim 1 wherein the step of dividing the input auditory signal into a plurality of spectral channels includes the step of applying the input auditory signal to a quadrature mirror filter bank.

4. The method of claim 1 wherein the step of determining the output gain for each channel includes the steps of determining a weighted energy history for each channel based on the time varying history of the energy in the channel, converting the weighted energy history into an RMS history weighting value between 0 and 1, and subtracting the RMS history weighting value from unity to determine the output gain for the channel.

5. The method of claim 4 wherein the step of determining the weighted energy history for each channel includes the step of determining the weighted energy history for each channel such that the energy in the channel in more recent time past is weighted more heavily than energy in the channel in the present and in the more distant past.

6. A method for enhancing an auditory signal, comprising the steps of:
    (a) dividing an input auditory signal into a plurality of spectral channels;
    (b) determining an output gain for each channel based on the time varying history of energy in the channel and the time varying history of energy in neighboring channels;

(c) applying the output gain for each channel to the channel to form a plurality of modified spectral channel signals; and (d) combining the plurality of modified spectral channel signals to form an enhanced output auditory signal.

7. The method of claim 6 wherein the step of dividing the input auditory signal into a plurality of spectral channels includes the step of applying the input auditory signal to a bank of gammatone filters.

8. The method of claim 6 wherein the step of dividing the input auditory signal into a plurality of spectral channels includes the step of applying the input auditory signal to a quadrature mirror filter bank.

9. The method of claim 6 wherein the step of determining the output gain for each channel includes the steps of determining a weighted energy history for each channel based on the time varying history of the energy in the channel, converting the weighted energy history into an RMS history weighting value, and subtracting the ratio of the RMS history weighting value in the channel to a sum of RMS history weighting values in neighboring channels from unity to determine the output gain for the channel.

10. The method of claim 9 wherein the step of determining the weighted energy history for each channel includes the step of determining the weighted energy history for each channel such that the energy in the channel in more recent time past is weighted more heavily than energy in the channel in the present and in the more distant past.

11. A system for enhancing an auditory signal, comprising:

(a) a microphone for receiving an auditory signal and providing an analog electrical signal in response thereto;

(b) an analog-to-digital converter connected to the microphone for converting the analog electrical signal into a digital input signal;

(c) a signal processor system connected to the analog-to-digital converter for receiving the digital input signal and programmed to divide the input signal into a plurality of spectral channels, determine an output gain for each channel based on the time varying history of energy in the channel and wherein the magnitude of the output gain for each channel is inversely related to the history of energy in the channel, apply the output gain for each channel to the channel to form a plurality of modified spectral channel signals, and combine the plurality of modified spectral channel signals to form an enhanced digital output signal.

12. The system of claim 11 comprising additionally:

(a) an digital-to-analog converter connected to the signal processor system for converting the digital output signal to an analog electrical output signal; and (b) a speaker connected to the digital-to-analog converter for converting the analog electrical signal into an auditory signal.

13. The system of claim 12 wherein the microphone, analog-to-digital converter, signal processor system, digital-to-analog converter, and speaker are contained in a hearing aid device.

14. The system of claim 11 comprising additionally a speech recognition system connected to the signal processor system to receive the digital output signal therefrom.

15. A system for enhancing an auditory signal, comprising:

(a) a microphone for receiving an auditory signal and providing an analog electrical signal in response thereto;

(b) an analog-to-digital converter connected to the microphone for converting the analog electrical signal into a digital input signal;

(c) a signal processor system connected to the analog-to-digital converter for receiving the digital input signal and programmed to divide the input signal into a plurality of spectral channels, determine an output gain for each channel based on the time varying history of energy in the channel and the time varying history of energy in neighboring channels, apply the output gain for each channel to the channel to form a plurality of modified spectral channel signals, and combine the plurality of modified spectral channel signals to form an enhanced digital output signal.

16. The system of claim 15 comprising additionally:

(a) an digital-to-analog converter connected to the signal processor system for converting the digital output signal to an analog electrical output signal; and (b) a speaker connected to the digital-to-analog converter for converting the analog electrical signal into an auditory signal.

17. The system of claim 16 wherein the microphone, analog-to-digital converter, signal processor system, digital-to-analog converter, and speaker are contained in a hearing aid device.

18. The system of claim 15 comprising additionally a speech recognition system connected to the signal processor system to receive the digital output signal therefrom.

\* \* \* \* \*

UNITED STATES PATENT AND TRADEMARK OFFICE
CERTIFICATE OF CORRECTION

PATENT NO.    : 6,732,073 B1
DATED         : May 4, 2004
INVENTOR(S)   : Kluender et al.

It is certified that error appears in the above-identified patent and that said Letters Patent is hereby corrected as shown below:

<u>Title page,</u>
Item [*] Notice, delete the phrase "by 631 days" and insert -- by 727 days --

Signed and Sealed this

Fifth Day of October, 2004

JON W. DUDAS
*Director of the United States Patent and Trademark Office*